(12) United States Patent
Shpiner et al.

(10) Patent No.: US 10,476,803 B2
(45) Date of Patent: Nov. 12, 2019

(54) ELEPHANT FLOW DETECTION IN NETWORK ACCESS

(71) Applicant: MELLANOX TECHNOLOGIES, LTD., Yokneam (IL)

(72) Inventors: Alex Shpiner, Nesher (IL); Liran Liss, Atzmon (IL); Matty Kadosh, Hadera (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 15/844,658

(22) Filed: Dec. 18, 2017

(65) Prior Publication Data

US 2019/0190838 A1 Jun. 20, 2019

(51) Int. Cl.
| | |
|---|---|
| *H04L 12/851* | (2013.01) |
| *H04L 12/875* | (2013.01) |
| *H04L 12/833* | (2013.01) |
| *H04L 12/865* | (2013.01) |
| *H04L 12/863* | (2013.01) |

(Continued)

(52) U.S. Cl.
CPC ...... *H04L 47/2441* (2013.01); *H04L 47/2483* (2013.01); *H04L 47/31* (2013.01); *H04L 47/56* (2013.01); *H04L 47/6255* (2013.01); *H04L 47/6275* (2013.01); *H04L 43/0882* (2013.01); *H04L 47/20* (2013.01)

(58) Field of Classification Search
CPC ... H04L 43/026; H04L 43/0882; H04L 43/16; H04L 47/11; H04L 47/125; H04L 47/20; H04L 47/2441; H04L 47/2483; H04L 47/25; H04L 47/29; H04L 47/31; H04L 47/32; H04L 47/56; H04L 47/6215; H04L 47/6255; H04L 47/6275; H04L 49/252
See application file for complete search history.

(56) References Cited

U.S. PATENT DOCUMENTS

| | | |
|---|---|---|
| 5,278,969 A | 1/1994 | Pashan et al. |
| 5,541,912 A | 7/1996 | Choudhury et al. |
| 6,570,403 B2 | 5/2003 | Liu et al. |

(Continued)

FOREIGN PATENT DOCUMENTS

| | | | | |
|---|---|---|---|---|
| CN | 101741729 A | * | 6/2010 | ............ H04L 47/29 |
| CN | 101741729 B | * | 12/2012 | ............ H04L 47/29 |

(Continued)

OTHER PUBLICATIONS

Liu et al., An adaptive approach for elephant flow detection with the rapidly changing traffic in data center network, Jul. 2017, International Journal of Network Management. e1987. 10.1002/nem.1987. (Year: 2017).*

(Continued)

*Primary Examiner* — Eric Nowlin
(74) *Attorney, Agent, or Firm* — Kligler & Associates

(57) ABSTRACT

A network element connected to a data network holds a flow of data packets in a queue and periodically determines a metric of the queue. Responsively to a predetermined value of the metric the queue is associated with an elephant flow or a mouse flow. The packets are marked according to the associated flow, and the network element sends the marked packets into the data network. Other network elements process the packets according to the associated flow marked therein.

17 Claims, 5 Drawing Sheets

(51) Int. Cl.
*H04L 12/26* (2006.01)
*H04L 12/813* (2013.01)

(56) References Cited

U.S. PATENT DOCUMENTS

| | | | | |
|---|---|---|---|---|
| 7,688,734 | B2* | 3/2010 | Hellenthal | H04L 47/10 370/229 |
| 8,031,607 | B2* | 10/2011 | Rochon | H04L 69/04 370/235 |
| 8,588,070 | B2* | 11/2013 | Post | H04L 47/29 370/235 |
| 8,730,819 | B2* | 5/2014 | Liu | H04L 43/12 370/241 |
| 9,124,515 | B2* | 9/2015 | Curtis | H04L 47/2441 |
| 9,185,015 | B2* | 11/2015 | Matthews | H04L 43/0888 |
| 9,548,924 | B2* | 1/2017 | Pettit | H04L 47/125 |
| 9,608,938 | B2* | 3/2017 | Venkatesan | H04L 49/25 |
| 9,705,808 | B2* | 7/2017 | Arumilli | H04L 47/11 |
| 9,755,948 | B1* | 9/2017 | Viljoen | H04Q 11/0005 |
| 9,806,987 | B2* | 10/2017 | Avci | H04L 45/121 |
| 9,838,276 | B2* | 12/2017 | Pettit | H04L 47/125 |
| 9,929,933 | B1* | 3/2018 | Viljoen | H04B 10/27 |
| 9,967,199 | B2* | 5/2018 | Lambeth | H04L 47/2441 |
| 10,129,135 | B1* | 11/2018 | Viljoen | H04L 45/08 |
| 10,158,538 | B2* | 12/2018 | Pettit | H04L 43/026 |
| 10,225,169 | B2* | 3/2019 | Narayanan | H04L 43/062 |
| 2002/0178311 | A1 | 11/2002 | Liu et al. | |
| 2007/0121504 | A1* | 5/2007 | Hellenthal | H04L 47/10 370/230 |
| 2010/0124234 | A1* | 5/2010 | Post | H04L 47/29 370/412 |
| 2010/0188974 | A1* | 7/2010 | Rochon | H04L 69/04 370/230 |
| 2011/0085461 | A1* | 4/2011 | Liu | H04L 43/12 370/252 |
| 2012/0131222 | A1 | 5/2012 | Curtis et al. | |
| 2014/0233421 | A1* | 8/2014 | Matthews | H04L 43/0888 370/253 |
| 2014/0237118 | A1* | 8/2014 | Matthews | H04L 47/2441 709/226 |
| 2014/0337856 | A1* | 11/2014 | Lee | G06F 9/5033 718/107 |
| 2015/0071072 | A1 | 3/2015 | Ratzin et al. | |
| 2015/0124825 | A1 | 5/2015 | Dharmapurikar et al. | |
| 2015/0163117 | A1* | 6/2015 | Lambeth | H04L 47/2441 709/224 |
| 2015/0163142 | A1* | 6/2015 | Pettit | H04L 47/125 370/230 |
| 2015/0163144 | A1 | 6/2015 | Koponen et al. | |
| 2015/0163145 | A1* | 6/2015 | Pettit | H04L 47/125 370/237 |
| 2015/0271081 | A1* | 9/2015 | Arumilli | H04L 47/11 370/235 |
| 2015/0341247 | A1* | 11/2015 | Curtis | H04L 47/2441 709/224 |
| 2016/0036689 | A1* | 2/2016 | Avci | H04L 45/121 370/235 |
| 2016/0036733 | A1 | 2/2016 | Srinivasan | |
| 2016/0050150 | A1* | 2/2016 | Venkatesan | H04L 49/25 370/236 |
| 2016/0105343 | A1 | 4/2016 | Janarthanan et al. | |
| 2016/0301632 | A1* | 10/2016 | Anand | H04L 47/125 |
| 2017/0118090 | A1 | 4/2017 | Pettit et al. | |
| 2017/0149640 | A1* | 5/2017 | Narayanan | H04L 43/062 |
| 2017/0195240 | A1* | 7/2017 | Chen | H04L 43/00 |
| 2018/0048571 | A1* | 2/2018 | Dharmapurikar | G11C 15/04 |
| 2018/0241677 | A1* | 8/2018 | Srebro | H04L 47/6295 |
| 2018/0331961 | A1* | 11/2018 | Lambeth | H04L 43/026 |
| 2019/0190838 | A1* | 6/2019 | Shpiner | H04L 47/2441 |

FOREIGN PATENT DOCUMENTS

| | | | | |
|---|---|---|---|---|
| CN | 106062726 A | * | 10/2016 | H04L 47/11 |
| CN | 108809826 A | * | 11/2018 | |
| CN | 109005126 A | * | 12/2018 | |
| EP | 2187580 A1 | * | 5/2010 | H04L 47/29 |
| EP | 2187580 B1 | * | 1/2013 | H04L 47/29 |
| EP | 3079303 A1 | * | 10/2016 | H04L 43/062 |
| EP | 3120253 A1 | * | 1/2017 | H04L 47/11 |
| EP | 3079303 A4 | * | 2/2017 | H04L 43/062 |
| KR | 20140133295 A | * | 11/2014 | G06F 9/5033 |
| WO | WO-2015142568 A1 | * | 9/2015 | H04L 47/11 |
| WO | WO-2018223825 A1 | * | 12/2018 | |

OTHER PUBLICATIONS

Ruthstein et al., U.S. Appl. No. 15/896,128, filed Feb. 14, 2018.

Network Heresy, "Of Mice and Elephants", Network Virtualization and the End-to-End Principle, 2 pages, Nov. 1, 2013 l.

Cheng et al., "Isolating Mice and Elephant in Data Centers", 14 pages, Jun. 1, 2016.

Mori et al., "Identifying Elephant Flows Through Periodically Sampled Packets", IMC Proceedings of the 4th ACM SIGCOMM Conference on Internet measurement, pp. 115-120, Oct. 25-27, 2004.

Amante et al., "IPv6 Flow Label Specification", Request for Comments 6437, 15 pages, Nov. 2011.

U.S. Appl. No. 15/896,128 office action dated Apr. 4, 2019.

* cited by examiner

ELEPHANT FLOW DETECTION IN NETWORK ACCESS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over a communications network. More particularly, this invention relates to characterization of traffic flows in a packet switched network.

2. Description of the Related Art

The meanings of certain acronyms and abbreviations used herein are given in Table 1.

TABLE 1

Acronyms and Abbreviations

| | |
|---|---|
| NIC | Network Interface Controller |
| QoS | Quality of Service |
| TOR | Top of Rack |
| TCP | Transmission Control Protocol |
| RDMA | Remote Direct Memory Access |

A packet switched network may process different types of flows, which can be characterized as elephant flows and mouse flows. An elephant flow represents a long-lived flow or a continuous traffic flow that is typically associated with high volume connection. A mouse flow represents a short-lived flow. Mice flows are often associated with bursty, latency-sensitive applications, whereas elephant flows tend to be associated with large data transfers in which throughput over a sustained period of time is more important than latency.

Elephant flows tend to fill network buffers, which produces a queuing delay to anything that shares such buffers, in particular mouse flows. Mouse flows should generally receive high priority in order to comply with quality-of-service (QoS) requirements. Detection of elephant flows, is useful, not only for discrimination from mouse flows, but also for load-balancing and for network analysis generally.

There are many proposals for identifying elephant flows. For example, U.S. Patent Application Publication No. 2015/0124825 proposes tracking data flows and identifying large-data flows by extracting fields from a packet of data to construct a flow key, computing a hash value on the flow key to provide a hashed flow signature, entering and/or comparing the hashed flow signature with entries in a flow hash table. Each hash table entry includes a byte count for a respective flow. When the byte count for a flow exceeds a threshold value, the flow is added to a large-data flow table and the flow is then tracked in the large-data flow table.

U.S. Patent Application Publication No. 2017/0118090 proposes a forwarding element that inspects the size of each of several packets in a data flow to determine whether the data flow is an elephant flow. When the forwarding element receives a packet in a data flow, the forwarding element identifies the size of the packet. The forwarding element then determines if the size of the packet is greater than a threshold size. If the size is greater, the forwarding element specifies that the packet's data flow is an elephant flow.

SUMMARY OF THE INVENTION

According to disclosed embodiments of the invention, elephant flows are classified and marked at the network edge, i.e., in nodes or hosts that originate the flows, intelligent NICs or TOR switches. Thereafter, standard QoS policies are applied as the marked packets traverse the network. Classification in the network elements of this sort is preferably hardware-implemented. In embodiments of the invention strategies employed for the packet classification include (1) queue length determination and (2) byte rate measurements.

There is provided according to embodiments of the invention a method, which is carried out by holding a flow of data packets in a queue in a network element connected to a data network and periodically determining a metric of the queue. Responsively to a predetermined value of the metric the queue is associated with an elephant flow or a mouse flow. The method is further carried out by marking the packets according to the associated flow, and thereafter sending the marked packets from the network element into the data network.

A further aspect of the method includes originating the flow in the network element. The network element can be a network interface controller.

According to one aspect of the method, the metric is a number of bytes of data in the queue.

According to a further aspect of the method, the metric is a byte rate through the queue.

Yet another aspect of the method includes receiving the marked packets in another network element, and in the other network element applying a quality of service (QoS) policy to the received packets responsively to the flow category thereof.

One aspect of the method includes processing the marked packets in other network elements of the data network in accordance with the flow category thereof.

In still another aspect of the method when in a first performance of determining a metric and associating the queue, the associated flow fails to exceed the predetermined value of the metric and is classified as the mouse flow, and in a second performance of determining a metric and associating the queue the associated flow exceeds the predetermined value of the metric and is reclassified as the elephant flow The method is further carried out by modifying the predetermined value of the metric to inhibit a reclassification of the associated flow to the mouse flow in subsequent performances of determining a metric and associating the queue.

Another aspect of the method includes modifying the predetermined value of the metric, and applying the modified predetermined value to queues that are associated with elephant flows to inhibit association thereof with mouse flows.

In an additional aspect of the method there are a plurality of flows having respective identifiers. The method is further carried out by grouping the identifiers into a plurality of ranges, collectively determining the metric in groups of the flows that are associated with respective ranges, and subdividing at least one of the ranges into subranges when a predetermined activity level applicable to the one range is exceeded.

There is further provided according to embodiments of the invention an apparatus, including a computing device connected to a data network, a memory holding a flow of data packets in a queue, and a network interface controller that is cooperative with the computing device for periodically determining a metric of the queue, and, responsively to a predetermined value of the metric, associating the queue with an elephant flow or a mouse flow, marking the packets according to the associated flow, and thereafter sending the marked packets from the network interface controller into the data network.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.
Definitions According to RFC 6437, and as used herein, a flow (or data flow) is a sequence of packets sent from a particular source to a particular unicast, anycast, or multicast destination that the source desires to label as a flow. A flow could consist of all packets in a specific transport connection or a media stream.
Overview.

Figure 1:
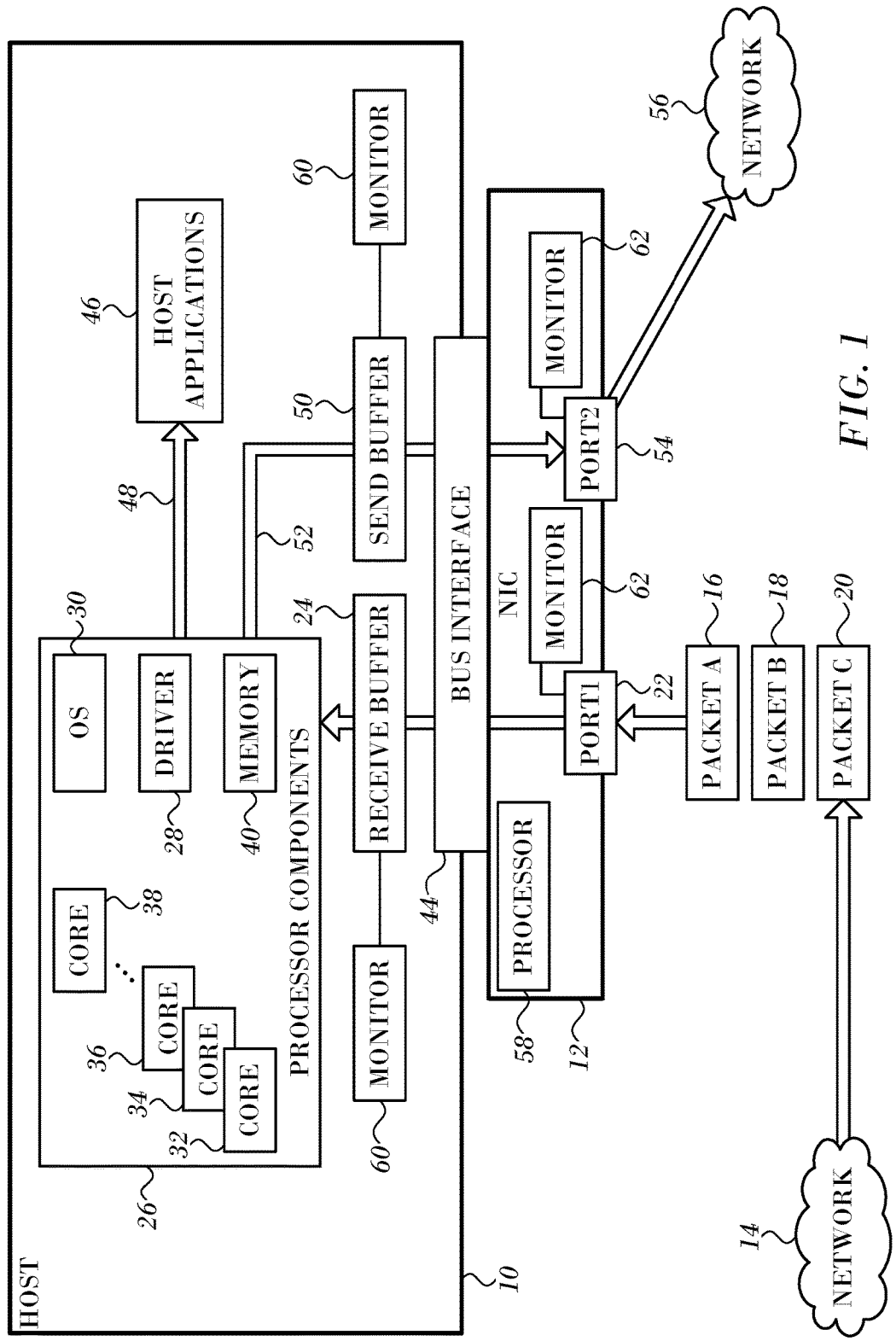
FIG. 1 schematically illustrates a network element, which is connected via a network interface to a data network in accordance with an embodiment of the invention.

Turning now to the drawings, reference is initially made to FIG. 1, which schematically illustrates a network element or node, host 10, which is connected via network interface 12 to a data network 14 in accordance with an embodiment of the invention. Although portions of the arrangement shown in FIG. 1 are shown as comprising a number of separate functional blocks, these blocks are not necessarily separate physical entities, but rather may represent, for example, different computing tasks or data objects stored in a memory. In practice, however, these blocks are typically (although not necessarily) implemented as hardware and firmware components within a single integrated circuit chip or chipset.

A stream of incoming data packets, here represented by packets 16, 18, 20, arrives from the network 14, entering the network interface 12 via port 22. The packets 16, 18, 20 are communicated from the network interface 12 to a packet queue in a receive buffer 24. While the receive buffer 24 is shown within the host 10, it may be implemented within the network interface 12.

Processor components 26 comprises network driver 28, operating system 30, and a plurality of cores 32, 34, 36, 38. While four cores are shown in the example of FIG. 1, any number of cores may be present. In addition a suitable memory 40 is provided for processing the packets 16, 18, 20. The principles of the invention are applicable to many multi-processor architectures other than the example of FIG. 1. Thus, the term "CPU" may be used interchangeably with "core" in this disclosure. A core may be a processing element of a logical processor as well as a physical processor. Network interface 12 is connected to the system components 26 via a peripheral component bus 42, such as a PCI Express bus, through a bus interface 44. Elements of the packets 16, 18, 20 are extracted from the receive buffer 24 and distributed into a number of tables in memory 40 that are maintained for purposes of packet steering.

In general one set of the incoming packets 16, 18 20 are destined for use by host applications 46, as indicated by arrow 48. It is the responsibility of the network driver 28 and the operating system 30 to process and forward another set of incoming packets that constitutes IP forwarding traffic.

In some embodiments, when it is determined by logic within the system components 26 that a given packet constitutes IP forwarding traffic an entry is established for the packet in a send buffer 50. The network driver 28 places the payload of the current packet in a queue.

The IP forwarding traffic is returned to the network interface 12, as indicated by arrow 52. The IP forwarding traffic then leaves the network interface 12 via port 54 and is returned to network 56, which may be the same as network 14 or may be a different network as shown in FIG. 1. Alternatively the network interface 12 can receive traffic that is originated by the host 10. Traffic of the latter sort is the subject of the present disclosure.

In some embodiments most of the packet classification functions described below are handled by the operating system 30 of the host 10. In other embodiments the network interface 12 may include a processor 58, which can perform at least a portion of the packet classification functions.

Buffers within the host 10 and network interface 12 are employed as queues for packets at various packet processing stages, for example ports 22, 54 of the network interface 12 and the receive buffer 24 and send buffer 50 in the host 10. These buffers may be provided with queue monitors 60 and port monitors 62, which can determine queue length, queue processing rate (bytes/sec), or both. Thus the amount of data that is injected into a network can be measured, typically by periodic sampling.
Packet Classification.

According to embodiments of the invention, classification and marking of packets as belonging to elephant flows or mice flows is performed before the packets are injected into the network in a way that is scalable and transparent to host applications. Two alternatives to implement this solution are presented. One alternative relies on counting the length (or size) of application queues. Another alternative is based on sampling and counting the amount of injected traffic per flow. The embodiments that follow are explained with respect to queues in the ports of the network interface 12, but are applicable, mutatis mutandis, to other queues in the host 10 such as the send buffer 50, and other queues that may be implemented in the network interface 12, particularly in more advanced models of the network interface 12 in which routing functions are offloaded from the host 10. In any case the packet classification is accomplished prior to injection of the packet into the network.

In a practical network environment, large numbers of flows may be tracked, typically using a flow cache that is searched based on some packet key that defines a flow, such as information in the packet header. If a cache miss occurs, then a new flow is recognized. Suitable cache management techniques for large numbers of flows are disclosed in application Ser. No. 15/896,128, entitled Ability to Detect Unlimited Elephant Flows, which is herein incorporated by reference.

Preventing Packet Reordering Using Hysteresis.

Many network protocols are sensitive to in-flow packet reordering, and behave optimally when packets within a flow arrives in order. Embodiments employing the methods described below may cause packet reclassification for flows in which a queue length or byte rate frequently varies around a threshold value. Moreover it is undesirable to reclassify flows that are about to finish their injection. Both cases will cause packets from a flow to be alternatively marked as mice packets and elephant packets, i.e., as belonging to mice flow or elephant flows, respectively, with the result that packets of the flow can be processed according to different traffic classes in the switches, e.g., enqueued into queues having differing priorities.

The methods can be implemented at any queue, even in switches inside the network. However it is recommended to apply the methods as early as possible, using the application flow queues and counters, such as TCP sockets or RDMA queue pairs. This is superior to the use of aggregated queues or hashing multiple flows into a limited number of queues and counters. Applying the methods in the network element that originates the flow is most effective.

To avoid undesired packet reclassification, a queue of mouse packets, which were reclassified as elephant packets remain in their new state as elephant packets until the queue empties (or its length falls below a predefined length).

In a typical network configuration, which strictly prioritizes mice flows over elephant flows, packet reordering in a flow is avoided when the flow moves from a mouse state to an elephant state, but not vice versa.

First Alternate Embodiment

Figure 2:
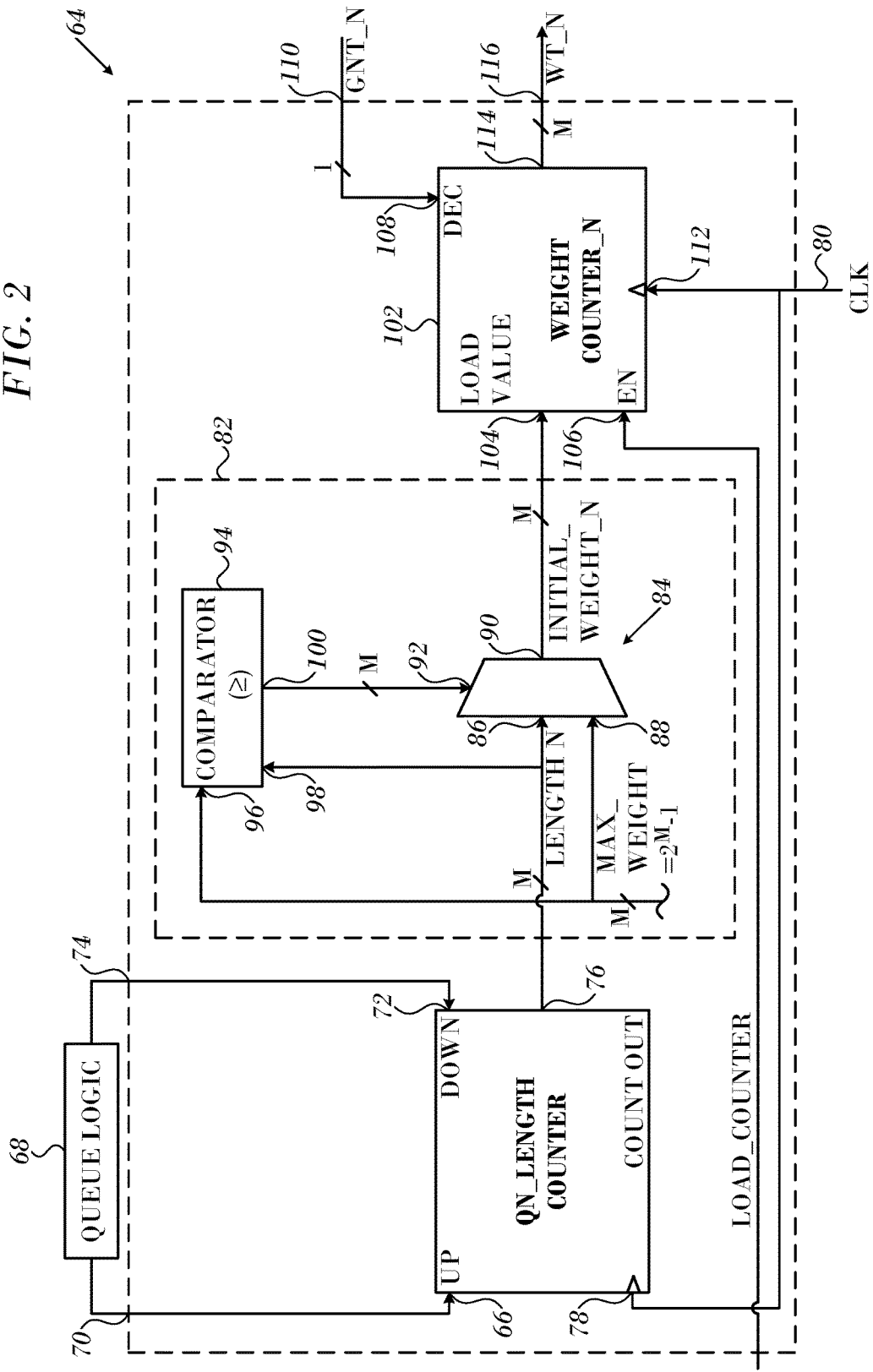
FIG. 2 is a schematic illustration of a circuit or determining queue length that is incorporated into a computing device in accordance with an embodiment of the invention.

In this embodiment elephant flow detection is based on queue length (averaged over a sampling period). Flows may be assigned to respective queues, for example, different ports in the network interface 12. FIG. 2 is a schematic illustration of a circuit 64 for determining queue length and for weighting the result, which is disclosed in U.S. Patent Application Publication No. 20020178311 to Liu et al. A length counter circuit 64 for determining a corresponding length value associated with a corresponding queue, the corresponding length value being indicative of a number of data packets currently enqueued. The length counter circuit 64 includes a counter having a length of N=10 bits, and each of the queues may enqueue up to 1024 data packets, which may be stored in a buffer (not shown).

The length counter circuit 64 includes: an up-count input 66 for receiving receive an enqueue signal from queue logic 68 via input 70; a down-count input 72 for receiving a dequeue signal from the queue logic 68 via input 74 of the length counter circuit 64, a length output 76 for providing a corresponding one of a plurality of N length signals designated LENGTH_N and carrying a corresponding length value indicative of the number of data packets currently enqueued; and a clock input 78 for receiving a system clock signal 80 CLK.

The circuit length circuit 64 also comprises a weight determining circuit 82 including: a multiplexer 84 having a first input 86 for receiving the LENGTH_N signal from length output 76 of the length counter circuit 64, a second input 88 for receiving a maximum weight signal designated MAX_WEIGHT from a maximum weight source (not shown) as further explained below, an output 90 for providing a corresponding initial weight signal designated INITIAL_WEIGHT_N indicative of an initial weight value associated with the corresponding queue as further explained below, and a control input 92; and a comparator circuit 94 having a first input 96 for receiving the MAX_WEIGHT signal, a second input 98 for receiving the LENGTH_N signal from length output 76 of the length counter circuit 64, and an output 100 for providing a select signal to the control input 92 of multiplexer 84 as further explained below.

The length counter circuit 64 further includes a weight counter circuit 102 having: a load value input 104 for receiving the INITIAL_WEIGHT_N signal from output 90 of multiplexer 84; an enable signal input 106 for receiving the LOAD_COUNTER signal; a decrease input 108 for receiving the corresponding one of the grant signals designated GNT_0, GNT_1, GNT_2, and GNT_3 (FIG. 1A) via input 110; a clock input 112 for receiving the system clock signal 80 via the clock input 112 of the, weight circuit; and a weight count signal output 114 for providing a corresponding one of the weight count signals WT_0, WT_1, WT_2, and WT_3 via output 116 of the length counter circuit 64.

Each of the weight count signals WT_0, WT_1, WT_2, and WT_3 carries an M bit weight count value. The length signal designated LENGTH_N provided at length output 76 of the length counter circuit 64 carries an M bit length count value, and the MAX_WEIGHT signal provided to input 88 of the multiplexer 84 and to the first input 96 of the comparator circuit 94 carries an M bit maximum weight value, which is equal to $2^{(M-1)}$. In the described embodiment, the MAX_WEIGHT signal carries an M=3 bit maximum weight value, which is equal to $2^{(M-1)}=7$.

Therefore, the weight determining circuit 82 is operative to generate the INITIAL_WEIGHT_N signal carrying an M-bit initial weight value determined based on the M-bit length value received from the length counter circuit via the LENGTH_N signal. The comparator circuit 94 is operative to compare the M-bit length value, received at its first input 96 via the LENGTH_N signal, to the M-bit maximum weight value received at its second input 98 via the MAX_WEIGHT signal. If the length value is greater than or equal to the maximum weight value, that is if the length value is greater than or equal to 7, the control signal provided at output 100 of the comparator circuit 94 carries a binary HI high value causing multiplexer 84 to select the second input 88 thereby providing the maximum weight value at output 90 of the multiplexer. Therefore, the INITIAL_WEIGHT_N signal, provided by the multiplexer 84 to load value input 104 of the weight counter circuit 102, carries the M-bit length value if the length value is less than the maximum weight value, or carries the maximum weight value if the length value is greater than or equal to the maximum weight value. The functioning of the weight determining circuit 82 may be expressed in accordance with the pseudocode in Listing 1:

---
Listing 1
---
If LENGTH_N<MAX_WEIGHT then
    INITIAL_WEIGHT_N=LENGTH_N
Else
    INITIAL_WEIGHT_N=MAX_WEIGHT
---

The weight counter circuit 102 receives the initial weight value at load value input 104 via the INITIAL_WEIGHT_N signal when the LOAD_COUNTER signal received at its input 106 is asserted. The weight counter circuit 150 includes an M-bit weight count register (not shown) for storing a corresponding weight count value. In the described embodiment, the weight count register is an M=3 bit register. When the LOAD_COUNTER signal is asserted at an initial time, the weight count register is loaded with a corresponding initial weight value received at input 152 via the INITIAL_WEIGHT_N signal. During subsequent cycles of the system clock, the weight count value is decreased by one in response to the corresponding grant signal, received at input 108, being asserted. The weight circuit 150 is operative to generate the corresponding one of the weight count signals WT_0, WT_1, WT_2, and WT_3, which carries the corresponding M-bit weight count value.

Queues having a length at any time during a sampling period that exceeds a predetermined value are classified as elephant queues, i.e., the flows therein are elephant flows. Typically, a queue length (for length-based methods) that exceeds 10% of the available buffer space, e.g., exceeds 64 Kbytes, or a queue length/sampling period (for rate-based methods) that exceeds 10% of the link bandwidth (10 Gbps in a 100 Gb link) indicates an elephant flow. Otherwise the queues are classified as mice queues. Packets departing elephant queues and mice queues are denoted as elephant packets and mice packets, respectively.

Second Alternate Embodiment

In this method the elephant detection relies on counting the amount of injected data from a queue to the network. Periodically (every S seconds), the flow counters in the queue monitors are sampled and reset. The value of S is typically in the order of tens of microseconds. For example, a flow that exceeds a predetermined average rate (B bytes/sec) over a predetermined interval, i.e., queues that are sampled with a value exceeding B*S are classified as elephant queues, and otherwise classified as mice queues. Similarly to the previous embodiment, packets that depart from elephant queues are marked as elephant packets, and packets that depart from mice queues are marked as mice packets.

Figure 3:
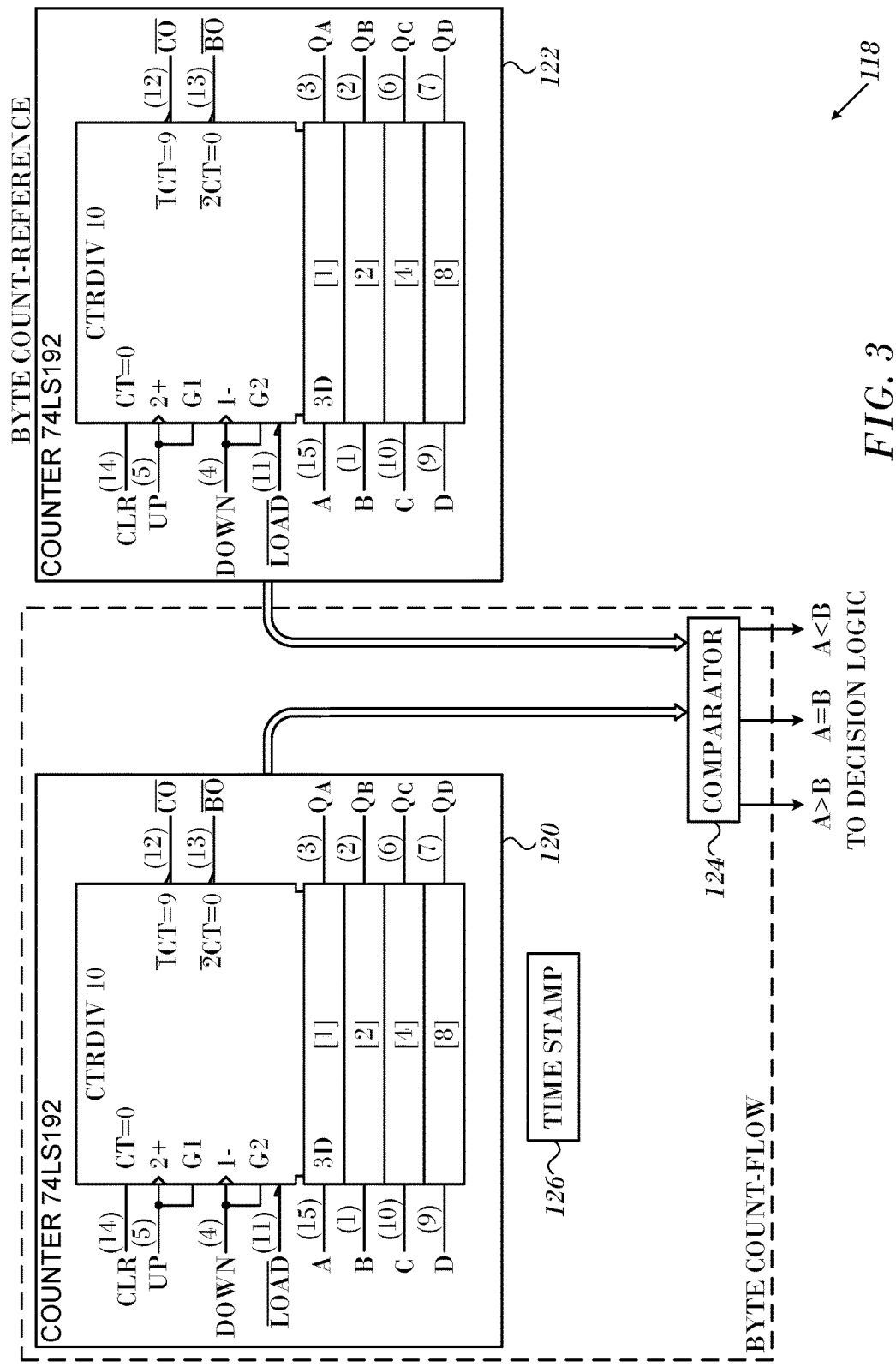
FIG. 3 is a detailed block diagram of a flow classifier in accordance with an embodiment of the invention.

Reference is now made to FIG. 3, which is a detailed block diagram of a flow classifier 118 in accordance with an embodiment of the invention. Byte counts of the flow packets are accumulated in counter 120. A reference counter 122, counts at a predetermined rate. From time to time the outputs of the counters 120, 122 are input into a comparator 124. Outputs of the comparator indicate the relative magnitudes of the counters 120, 122. The outputs are fed to decision logic, where the flow is classified. A memory 126 holds a time stamp, which is set upon assignment of the flow classifier 118 as a cache entry for a newly identified flow.

The relationship between the counter 120 and the reference counter 122 is used to classify a flow as an elephant or mouse flow. For example, after a counting interval, when the counter 120 exceeds the reference counter 122 by a predetermined value, the flow may be classified as an elephant flow.

Implementation.

Figure 4:
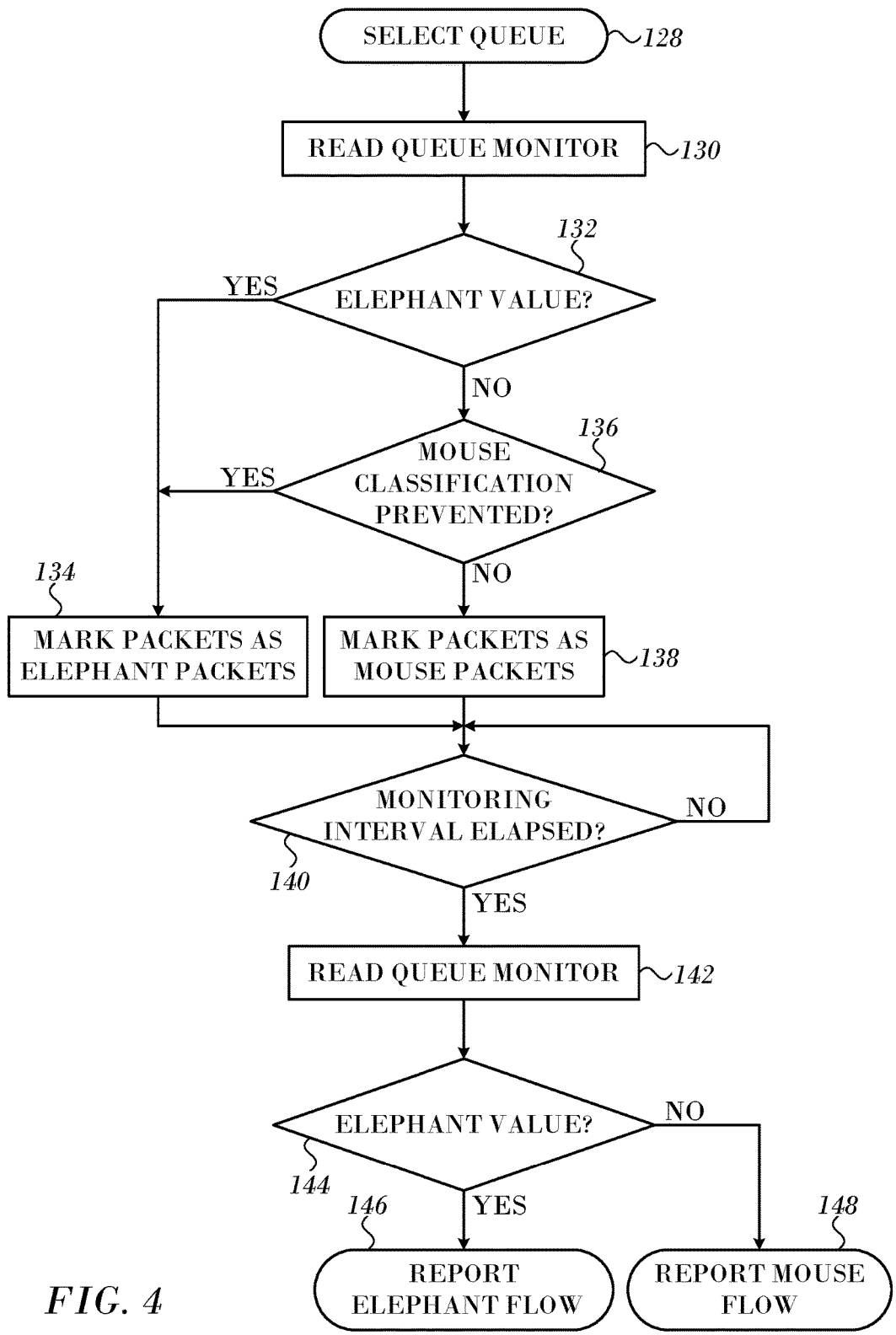
FIG. 4 is a flow chart of a method of packet classification in accordance with an embodiment of the invention.

Reference is now made to FIG. 4, which is a flow chart of a method of packet classification in accordance with an embodiment of the invention. The process steps are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 128 a queue is selected. It will be understood that a network element may be responsible for handling large numbers of flows. Thus many queues need to be examined, and this can be done concurrently in an efficient hardware implementation.

Next, at step 130 a metric of the selected queue is evaluated, using a queue monitor as described above in the discussion of FIG. 1. The metric can be either queue length or byte rate of the queue.

Next, at decision step 132, it is determined if the selected queue holds an elephant flow. If the determination at decision step 132 is affirmative, then control proceeds to step 134. All packets of the flow that are presently in the queue and subsequently arriving in the queue begin to be marked in the host or NIC of the host as elephant packets, i.e., belonging to an elephant flow.

If the determination at decision step 132 is negative, a further examination of the flow's history is made in decision step 136. It is desirable to inhibit toggling of flows between mouse and elephant states, for the reasons given above. In decision step 136 it is determined if there are issues that would prevent the flow from being classified as a mouse flow. If the flow has never been previously recognized as an elephant flow in a current or previous performance of step 130, then the question is irrelevant, and the determination is always negative. However if the flow is presently known as an elephant flow it is necessary to determine if criteria for reversion of an elephant flow to a mouse flow are satisfied. One such criterion can be an emptying of the queue, after which new packets may be reclassified. Additionally or alternatively a hysteresis factor can be imposed by reducing the threshold that defines an elephant flow and the reading of the queue monitor in step 130 is tested against the reduced value. For example, a mouse flow can be reclassified as an elephant flow if queue length >X and to reclassify an elephant flow as a mouse flow if queue length <Y, where Y<X.

A sufficient reduction over a predetermined time interval may allow reclassification of the flow with limited adverse effects elsewhere in the fabric.

If the determination in decision step 136 is negative, then in step 138 then packets emitted from the queue into the network are marked as mouse packets, i.e., belonging to a mouse flow.

If the determination at decision step 136 is affirmative, then in step 134 the packets emitted from the queue begin or continue to be processed as elephant packets.

After performing step 138 or step 134, at delay step 140 marking of packets continues as previously determined until it is time to redetermine the metric. This is done at periodically at preset intervals. Then at step 142 the metric is again evaluated, as in step 130.

Next, at decision step 144, it is determined whether, according to the metric, the flow has become an elephant flow. The same criteria are used as in decision step 132 together with decision step 136. If the determination at decision step 144 is affirmative, then the flow is classified as an elephant flow, and in final step 146 packets leaving the selected queue continue to be marked as elephant packets.

If the determination at decision step 144 is negative, then the flow is reported as a mouse flow in final step 148 and the packets continue to be marked as mouse packets.

The methods described above can be applied to any level of queue hierarchy that may be found in a particular system, so long as the packet is classified prior to sending it onto the wire. However, applying the methods to the flow queue or counter, e.g., TCP socket or RDMA queue pair, packets can be marked as elephant or mouse packets using any convenient field in the header, depending on the protocol employed. Network devices are configured to recognize the packet marking and to treat the packets in accordance with a governing network QoS policy, normally prioritizing packets marked as belonging to a mouse flow over packets marked as belonging to an elephant flow. Packets belonging to a mouse flow usually receive preferred treatment in matters of buffering, queueing and scheduling.

Adaptive Queue Measurement.

Figure 5:
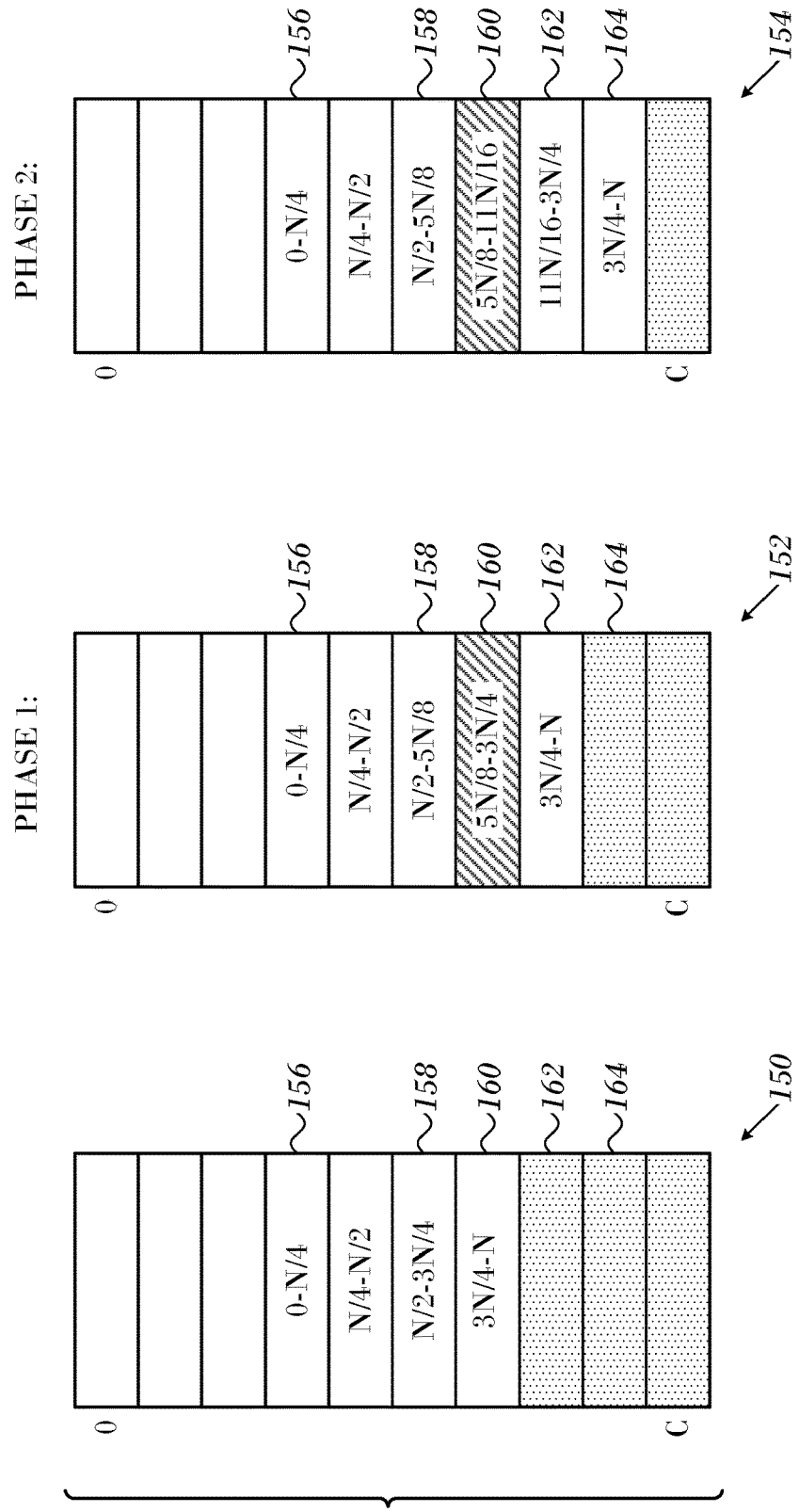
FIG. 5 illustrates re-mapping ranges to an array of counters in accordance with an embodiment of the invention.

When there is a large dynamic range of byte rates or queue lengths in different flows, for reasons of hardware limitations, it may not be feasible to obtain the necessary data with a single counter. This difficulty can be overcome by mapping sub-ranges into respective counters, particularly when a queue or counter corresponds to an elephant flow. Queue measurements are then taken from the counter or counters that embrace the appropriate subrange. Adaptation of this sort can be repeated when the counts exceed the current dynamic range so long as the flow continues. FIG. 5 illustrates re-mapping an array of counters in accordance with an embodiment of the invention, which achieves progressively higher granularity in certain subranges than the original mapping. In FIG. 5 three counter arrays 150, 152, 154 of C counters are represented by tables having entries with respective range assignments. Ranges inside the entries indicate the range of flow identifiers counted by the corresponding counter. For convenience the table entries are referred to as "counters".

For example, in array 150 counter 156 counts packets having flow identifiers ranging from 0-N/4. Counter 158 counts packets having flow identifiers that fall into the range N/2-3N/4. Counter 160 counts packets having flow identifiers in the range 3N/4-N. Counters 162, 164 are unassigned. In a practical system, the number of available counters limits the granularity that can be achieved by repeated subdivision of ranges.

In the array 152 it was necessary to subdivide the range N/2-3N/4, because a predetermined activity level was exceeded, perhaps because there were too many flows having identifiers in this range for the hardware to deal with. The counters of array 152 were reassigned or remapped to new ranges. Counter 156 continues to count packets having flow identifiers in the range 0-N/4. The range N/2-3N/4 has been subdivided into sub-ranges N/2-5N/8 and 5N/8-3N/4, which are counted by counters 158, 160, respectively. One of the flows counted by counter 160 has been determined to be an elephant flow. The range 3N/4-N is now counted by counter 162. Counter 164 remains unassigned.

In the array 154 a further reassignment of the counters was necessary due to overpopulation of the range 5N/8-3N/4. This range is now subdivided into subranges 5N/8-11N/16 and 11N/16-3N/4, which are counted by counters 160, 162, respectively. Counter 164 has now been assigned to count the packets having flow identifiers ranging from 3N/4-N. The elephant flow that was previously counted by counter 160 falls into the lower subrange 5N/8-11N/16 and continues to be counted by counter 160.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising steps of:
   holding a flow of packets in a queue in a network element, the network element being connected to a data network;
   in the network element periodically determining a metric of the queue;
   making an assignment of the flow to a flow category responsively to the metric by steps of:
   (a) when the metric of the queue exceeds a first predetermined value assigning the flow as an elephant flow; and
   (b) when the metric of the queue fails to exceed the first predetermined value, performing steps of:
   (1) when the flow is not currently assigned to the elephant flow assigning the flow as a mouse flow; and
   (2) when the flow held therein is currently assigned as the elephant flow assigning the flow the mouse flow only when the metric of the queue fails to exceed a second predetermined value, the second predetermined value being less the first predetermined value;
   marking the packets in the queue according to the assignment of the flow; and
   sending the marked packets from the network element into the data network.

2. The method according to claim 1, further comprising originating the flow in the network element.

3. The method according to claim 1, wherein the network element is a network interface controller.

4. The method according to claim 1, wherein the metric is a number of bytes of data in the queue.

5. The method according to claim 1, wherein the metric is a byte rate through the queue.

6. The method according to claim 1, further comprising steps of:
   receiving the marked packets in another network element; and
   in the other network element applying a quality of service (QoS) policy to the received packets responsively to the assignment of the flow.

7. The method according to claim 1, further comprising processing the marked packets in other network elements of the data network in accordance with the assignment of the flow.

8. The method according to claim 1, wherein the flow comprises a plurality of flows having respective identifiers, further comprising steps of:
   grouping the identifiers into a plurality of ranges;
   collectively determining the metric to groups of the flows that are associated with respective ranges; and
   subdividing one of the ranges into subranges when a predetermined activity level applicable to the one of the ranges is exceeded.

9. The method according to claim 1, wherein the network element is a network switch.

10. An apparatus, comprising:
a network interface controller connected to a data network and to a computing device;
a processor in the network interface controller and
a memory in the network interface controller holding a flow of packets in a queue, the network interface controller operative for:
with the processor in the network interface controller periodically determining a metric of the queue;
making an assignment of the flow to a flow category responsively to the metric by steps of:
  (a) when the metric of the queue exceeds a first predetermined value assigning the flow as an elephant flow; and
  (b) when the metric of the queue fails to exceed the first predetermined value, performing steps of:
    (1) when the flow is not currently assigned as the elephant flow assigning the flow as a mouse flow; and
    (2) when the flow held therein is currently assigned as the elephant flow assigning the flow to the mouse flow only when the metric of the queue fails to exceed a second predetermined value, the second predetermined value being less the first predetermined value;
marking the packets in the queue according to the assignment of the flow; and
sending the marked packets from the network interface controller into the data network.

11. The apparatus according to claim 10, wherein the computing device is configured for originating the flow.

12. The apparatus according to claim 10, wherein the metric is a number of bytes of data in the queue.

13. The apparatus according to claim 10, wherein the metric is a byte rate through the queue.

14. The apparatus according to claim 10, further comprising another network element configured for:
receiving the marked packets therein; and
applying a quality of service (QoS) policy to the received packets responsively to the flow category thereof.

15. The apparatus according to claim 10, further comprising another network element configured for processing the marked packets of the data network in accordance with the flow category thereof.

16. The apparatus according to claim 10, wherein the flow comprises a plurality of flows having respective identifiers, wherein the computing device or the network interface controller is configured for:
grouping the identifiers into a plurality of ranges;
collectively determining the metric to groups of the flows that are associated with respective ranges; and
subdividing one of the ranges into subranges when a predetermined activity level applicable to the one of the ranges is exceeded.

17. The apparatus according to claim 10, further comprising an plurality of counters, a first portion of the counters being assigned to count respective ranges of flow identifiers and a second portion of the counters being unassigned, wherein the processor in the network interface controller is configured for:
recognizing that counts recorded by the counters exceed a dynamic range of the counters; and
thereafter remapping the counters into new ranges by assigning the second portion of the counters to subranges of the ranges of flow identifiers.

* * * * *